Nov. 6, 1934.   C. S. ANDERSON   1,979,304
METHOD OF CONNECTING CABLES AND THE LIKE AND ARTICLE PRODUCED THEREBY
Filed April 30, 1930
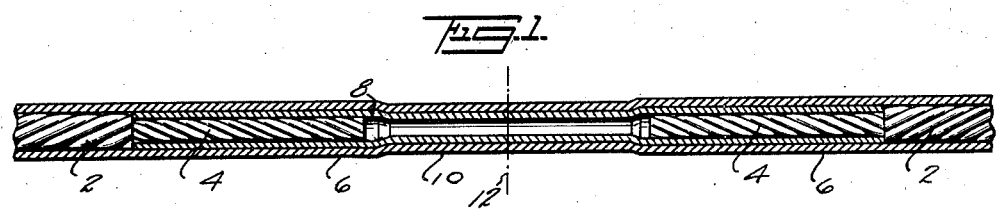
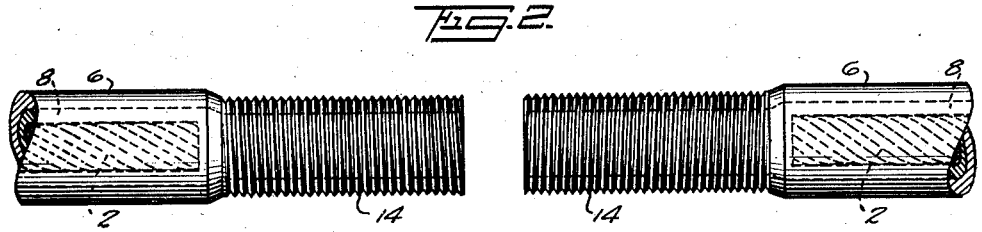
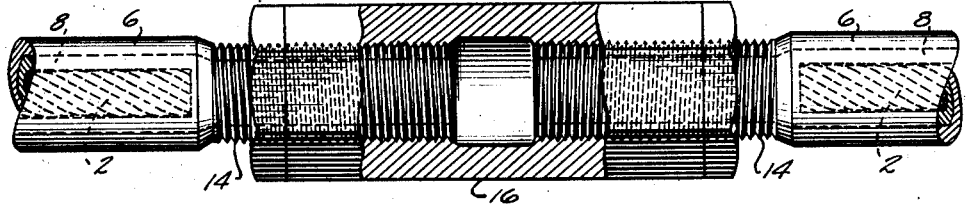
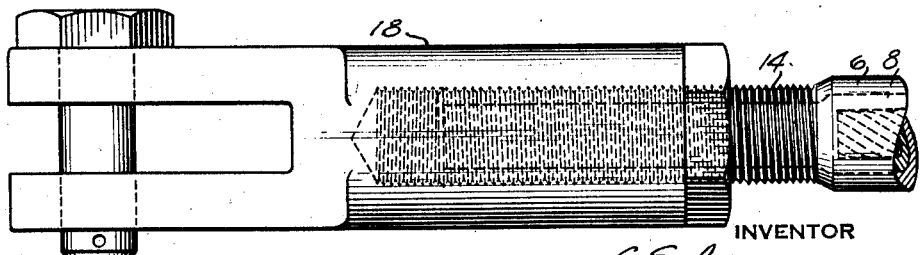
INVENTOR
C. S. ANDERSON
BY
ATTORNEYS Patented Nov. 6, 1934

1,979,304

UNITED STATES PATENT OFFICE 1,979,304

METHOD OF CONNECTING CABLES AND THE LIKE AND ARTICLE PRODUCED THEREBY

Cedric S. Anderson, Waterbury, Conn., assignor to The American Brass Company, Waterbury, Conn., a corporation of Connecticut Application April 30, 1930, Serial No. 448,669

6 Claims. (Cl. 29—148)

My invention relates to a method of making connections between rods, tubes, wires, ropes and the like, hereinafter for convenience designated as "bodies such as cables", and further relates to an article of manufacture that may be produced by carrying out the method.

One of the objects of my invention is to provide a novel and improved method of this character.

Another object of my invention is to provide a novel and improved article of manufacture.

Still another object of my invention is to provide a novel and improved method of connecting bodies such as cables whereby the connection produced may be easily adjusted to take up slack, and in case a section of cable or other connected bodies becomes damaged, such section may be easily replaced.

The several features of the invention, whereby the above mentioned and other objects may be attained, will be readily understood from the following description and accompanying drawing, in which—

Figure 1 is a longitudinal sectional elevation of two cable ends and a connector for said ends, illustrating one application of my improved method;

Fig. 2 is a side elevation on an enlarged scale of a portion of the parts illustrated in Fig. 1 but illustrating another adaptation of my improved method;

Fig. 3 is a sectional elevation of my completed connector in its preferred form connecting the ends of two cables; and Fig. 4 is a side elevation illustrating the method of connecting a clevis to one end of a cable.

In carrying out my improved method to connect relatively large cables 2, I provide the cables with reduced end portions 4. The ends of the cables are then inserted into the ends of two tubes or casings 6 and 8 arranged one within the other with the inner casing 8 surrounding said reduced end portions and the outer casing 6 surrounding the bodies of the cables a distance beyond said reduced end portions. The central portions 10 of the two casings are reduced in diameter, and the ends of the cables extend adjacent the ends of said reduced portions. When the cables are thus inserted, the casings are subjected to a suitable mechanical action applied to the surface of the outer casing so as to cause intimate inter-engagement of the materials of said casings and said cables. This operation may be performed by a split die initially positioned over the reduced portion 10 of the outer casing and moved in one direction over one end of the casing, and the operation subsequently repeated in the opposite direction, thus reducing the casings on the cable ends. The foregoing method is described and claimed in the patent to John C. Damon No. 1,855,340, dated April 26, 1932.

In accordance with the present invention, after the two casings have been drawn over the ends of the cables, the central reduced portions 10 of the casings are divided by a saw-cut as indicated at 12. The reduced divided ends of the outer casing are then provided with screw threads 14, the screw threads being right and left hand, respectively. A turn buckle or connector nut 16 is then adjustably screw-threaded over the threaded ends of the outer casing to complete the connection (Fig. 3).

A connection thus made is of great convenience to operative companies in the maintenance of their lines. In case a section of cable becomes damaged, a replacement is possible without any cutting away of existing joints, the joints at the ends of the damaged section being simply unscrewed and a new length of cable with similar terminals substituted. With the use of a long turn buckle or connector nut 16, the tension in the line may be easily adjusted. Moreover my improved method results in substantial saving of construction costs, as it is possible in most cases to install the cable terminals on the cable ends in the factory, thus reducing the amount of field work required.

For dead end connections, a clevis fitting 18 (Fig. 4) may be screw-threaded on the threaded end of the casing or terminal of the cable end, the joint between the clevis and the cable end terminal being the same as between the turn buckle or connector nut 14 and the divided casings or terminals.

While I have illustrated and described my improved method as used with a connector that consists of a plurality of tubular casings, it will be apparent that my improved method is well adapted for use with a connector which consists of but a single tubular casing, the latter being usually employed on the smaller cables. Also, in some cases the threading of the divided casing or terminals may be made over the end portions thereof that surround the ends of the cables, the portion of the casing between the ends of the cables being cut out. Another variation of my improved method which proves to be especially practical and convenient is to reduce the diameter of one end of the casing and screw thread the same during the manufacture of the connector prior to the application of the connector to the cable. It will also be apparent that various modifications may be made without departing from the spirit or scope of my invention

What I claim is:

1. The method of connecting the ends of bodies such as cables which comprises inserting said ends in the ends of a tubular casing with said ends of the bodies spaced apart, subjecting said casing to a suitable mechanical action so as to cause intimate inter-engagement of the materials of said casing and said bodies, dividing the casing between said ends of the bodies, screw-threading the divided end portions of the casing, and screwing a connecting member onto said threaded ends of the casing.

2. The method of connecting the ends of bodies such as cables which comprises inserting said ends in the ends of a tubular casing having its central portion reduced in diameter, the ends of the bodies being arranged adjacent the ends of said reduced portion of the casing, subjecting the casing to a suitable mechanical action so as to cause intimate inter-engagement of the materials of said casing and said bodies, dividing said casing at the reduced portion thereof, screw-threading the reduced divided end portions of the casing, and screwing a connecting member onto said reduced end portions of the casing.

3. The method of connecting the ends of bodies such as cables which comprises providing opposed ends of said bodies with reduced end portions, inserting said end portions into opposite ends respectively of two casings arranged one within the other with the inner casing surrounding both of said reduced end portions for a substantial distance and the outer casing surrounding said bodies a distance beyond said reduced end portions, subjecting both casings to a suitable mechanical action applied to the surface of the outer casing so as to cause intimate inter-engagement of the materials of said casings and said cable, the reduced ends of the bodies being spaced a distance apart within said casings, dividing said casings between said ends of the bodies, screw-threading the divided end portions of the outer casing, and screwing a connecting member over said screw-threaded ends of the outer casing.

4. The method of connecting a body such as a cable with another article which comprises inserting one end of said body within one end of a tubular casing, subjecting said end of the casing to a suitable mechanical action so as to cause intimate inter-engagement of the materials of said casing and said body, cutting off said casing outside of the extreme end of said body, screw-threading the outer end portion of said casing, and screwing a connecting member on said end of the casing.

5. An article of manufacture of the class described comprising two cables arranged end to end, a tubular casing surrounding said ends of the cables with the materials of said casing and the inserted ends of the cables in intimate inter-engagement, said casing being divided at a point between said ends of the cables, and a connector member adjustably connecting said divided ends of the casing.

6. The method of connecting a body such as a cable to another article which comprises reducing one end of a tubular casing, threading said reduced end inserting said body in the other end of said casing, subjecting the latter end to a suitable mechanical action so as to cause intimate inter-engagement of the materials of said casing and said body, and screwing a connecting member on said threaded reduced end of the casing.

CEDRIC S. ANDERSON.